United States Patent
Liu et al.

(10) Patent No.: US 9,705,743 B2
(45) Date of Patent: Jul. 11, 2017

(54) METHOD AND DEVICE FOR SHARING DATA

(71) Applicant: Xiaomi Inc., Beijing (CN)

(72) Inventors: Tiejun Liu, Beijing (CN); Zheng Li, Beijing (CN); Liang Cheng, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 444 days.

(21) Appl. No.: 14/513,227

(22) Filed: Oct. 14, 2014

(65) Prior Publication Data

US 2015/0263917 A1    Sep. 17, 2015

Related U.S. Application Data

(63) Continuation of application No. PCT/CN2014/082871, filed on Jul. 24, 2014.

(30) Foreign Application Priority Data

Mar. 13, 2014 (CN) .......................... 2014 1 0092860

(51) Int. Cl.
*G06F 15/173* (2006.01)
*H04L 12/24* (2006.01)
*H04L 12/28* (2006.01)

(52) U.S. Cl.
CPC ...... *H04L 41/0816* (2013.01); *H04L 12/2812* (2013.01)

(58) Field of Classification Search
CPC .................... H04L 12/2812; H04L 41/0816
See application file for complete search history.

(56) References Cited

U.S. PATENT DOCUMENTS

| 8,868,666 | B1 * | 10/2014 | Hellwege | ........... | H04N 21/4627 |
| | | | | | 709/203 |
| 2009/0046992 | A1 | 2/2009 | Kitagawa | | |
| 2010/0013161 | A1 | 1/2010 | Lowrance | | |
| 2010/0281534 | A1 | 11/2010 | Poder et al. | | |
| 2012/0215885 | A1 | 8/2012 | Lee et al. | | |

(Continued)

FOREIGN PATENT DOCUMENTS

| CN | 1787675 A | 6/2006 |
| CN | 101399905 A | 4/2009 |

(Continued)

OTHER PUBLICATIONS

European Search Report of EP15154552.
"International Search Report for PCT/CN2014/082871".

*Primary Examiner* — Tauqir Hussain
*Assistant Examiner* — Austin Moreau
(74) *Attorney, Agent, or Firm* — Jun He Law Offices P.C.; James J. Zhu (57) ABSTRACT

The present disclosure relates to a method and a device for sharing data, which relates to the field of communication. The method includes: monitoring an event of a removable storage device being plugged into the DLNA device; acquiring a mount path of the removable storage device through a DLNA server configured in the DLNA device, when the event of the removable storage device being plugged into the DLNA device has occurred; and sharing data in the removable storage device according to the mount path through the DLNA server.

5 Claims, 3 Drawing Sheets (56) References Cited

U.S. PATENT DOCUMENTS

| | | | |
|---|---|---|---|
| 2012/0303769 A1* | 11/2012 | Shen | H04L 67/1097 709/220 |
| 2013/0151574 A1* | 6/2013 | Li | G06F 17/30194 707/827 |
| 2013/0230297 A1 | 9/2013 | Oh et al. | |
| 2014/0053222 A1 | 2/2014 | Shoykher et al. | |
| 2014/0165190 A1* | 6/2014 | Quigley | G06F 21/556 726/22 |
| 2015/0263917 A1 | 9/2015 | Liu et al. | |

FOREIGN PATENT DOCUMENTS

| | | |
|---|---|---|
| CN | 101599970 A | 12/2009 |
| CN | 101674446 A | 3/2010 |
| CN | 101695060 A | 4/2010 |
| CN | 101969407 A | 2/2011 |
| CN | 102244597 A | 11/2011 |
| CN | 102572009 A | 7/2012 |
| CN | 103888527 A | 6/2014 |
| JP | 2009049574 A | 5/2009 |
| JP | 2015510708 A | 4/2015 |
| KR | 20060062859 A | 6/2006 |
| KR | 20060064503 A | 6/2006 |
| RU | 2461054 C2 | 9/2012 |
| WO | 2013103493 A1 | 7/2013 |

\* cited by examiner

METHOD AND DEVICE FOR SHARING DATA

CROSS REFERENCE TO RELATED APPLICATIONS

This application is a Continuation of International Application No. PCT/CN2014/082871, filed Jul. 24, 2014, which is based upon and claims the benefit of priority of Chinese Patent Application No. CN201410092860.2, filed Mar. 13, 2014, the entire contents of which are incorporated herein by reference.

TECHNICAL FIELD

The present disclosure generally relates to the field of communication, and more particularly, to a method and a device for sharing data.

BACKGROUND

DLNA (Digital Living Network Alliance) is a nonprofit organization, launched by Sony, Intel and Microsoft, that aims to solve problems of sharing digital media contents among consumer electronic devices.

A network architecture based on DLNA includes a DLNA client and a DLNA server, which are connected through a wired network or a wireless network there between. The DLNA server is configured to provided media contents and includes a platform for sharing multimedia files which supports sharing of media contents such as pictures, music, videos and the like. The DLNA client is configured to access and play the media contents shared by the DLNA server. The DLNA server manages and controls the shared media contents through a configuration file, and the media contents which are written in the configuration file in advance may be accessed and played by the DLNA client.

During the process of achieving the present disclosure, the inventor finds that the above method has at least the following disadvantages. In the related art, only the media contents which are written in the configuration file in advance may be shared by the DLNA server, however in a case that a removable storage device such as a U disk or a removable hard disk and the like is plugged into a DLNA device where the DLNA server runs, the DLNA server cannot share the media contents in the removable storage device with the DLNA client.

SUMMARY

Accordingly, a method and a device for sharing data are provided by embodiments of the present disclosure. The technical solutions are as follows.

According to a first aspect of the embodiments of the present disclosure, a method for sharing data in a Digital Living Network Alliance (DLNA) device is provided. The method comprises: monitoring an event of a removable storage device being plugged into the DLNA device; acquiring a mount path of the removable storage device through a DLNA server configured in the DLNA device, when the event of the removable storage device being plugged into the DLNA device has occurred; and sharing data in the removable storage device according to the mount path through the DLNA server.

According to a second aspect of the embodiments of the present disclosure, a Digital Living Network Alliance (DLNA) device is provided. The DLNA device comprises: a processor; and a memory for storing instructions executable by the processor, wherein the processor is configured to perform: monitoring an event of a removable storage device being plugged into the DLNA device; acquiring a mount path of the removable storage device through a DLNA server configured in the DLNA device, when the event of the removable storage device being plugged into the DLNA device has occurred; and sharing data in the removable storage device according to the mount path through the DLNA server.

According to a third aspect of the embodiments of the present disclosure, there is provided a non-transitory computer-readable storage medium having stored therein instructions that, when executed by a processor of a Digital Living Network Alliance (DLNA) device, causes the DLNA device to perform a method for sharing data, wherein the method comprises: monitoring an event of a removable storage device being plugged into the DLNA device; acquiring a mount path of the removable storage device through a DLNA server configured in the DLNA device, when the event of the removable storage device being plugged into the DLNA device has occurred; and sharing data in the removable storage device according to the mount path through the DLNA server.

According to a fourth aspect of the embodiments of the present disclosure, there is provided an apparatus for sharing data in the DLNA device. The apparatus comprises: a monitoring module for monitoring an event of a removable storage device being plugged into the DLNA device; a path acquisition module for acquiring a mount path of the removable storage device through a DLNA server configured in the DLNA device, when the event of the removable storage device being plugged into the DLNA device has occurred; and a data sharing module for sharing data in the removable storage device according to the mount path through the DLNA server.

Some advantages brought by the technical solutions according to the embodiments of the present disclosure may include the following advantages.

After the event of the removable storage device being plugged into the DLNA device is monitored by the DLNA device, the mount path of the removable storage device is acquired through the DLNA server and the data in the removable storage device is shared according to the mount path through the DLNA server. Thus, the problem in the related art that the DLNA server cannot share the media contents in the removable storage device is solved. Compared with the technical solution in the related art, in this embodiment, the DLNA server acquires the mount path of the removable storage device, then scans and acquires the data in the removable storage device according to the mount path, and then shares the data in the removable storage device with the DLNA client, so that the data in the removable storage device is shared in the DLNA system and the sharing capability of the DLNA system may be significantly improved.

It should be understood that the general description above and the detailed description below are only exemplary, and the present disclosure is not limited thereto.

BRIEF DESCRIPTION OF THE DRAWINGS

In order to describe the embodiments of the present disclosure more clearly, a brief introduction of the accompanying drawings used in the description will be given hereinafter. Obviously, the following accompanying drawings are merely some embodiments of the present disclosure, and a person skilled in the art may obtain other drawings according to the following accompanying drawings without any creative labor.

Embodiments of the present disclosure are illustrated in the above accompanying drawings and will be described in further detail hereinafter. These accompanying drawings and literal description are not intended to limit the scope of the inventive concepts of the present disclosure, but are to explain the principle of the present disclosure with reference to particular embodiments for those skilled in the art.

DETAILED DESCRIPTION

In order to make the objectives, technical solutions and advantages of the present disclosure more apparent, embodiments of the present disclosure will be described in further details with reference to the accompanying drawings. Obviously, based on the embodiments of the present disclosure, other embodiments derived by a person skilled in the art without any creative labor are all within the protective scope of the present disclosure.

Before the description of the method for sharing data in a DLNA device provided by the present disclosure, the DLNA device related to the present disclosure will be described. The DLNA device may be a smart router, which includes an independent operating system in addition to router functions in an ordinary router, and may allow users to install various applications, and also has a powerful USB (Universal Serial Bus) sharing function.

A DLNA server runs on the DLNA device. In other words, the DLNA server is configured or provided in the DLNA device. The DLNA server is an application with the type being server type, and is configured to implement the sharing of media contents such as pictures, music, videos and the like. The DLNA server runs on an operating system, which may be a fully customized operating system based on OpenWrt. The DLNA device may also include a storage medium such as a hard disk, which is configured to store data such as pictures, music and videos. In addition, the DLNA device also includes a USB interface, which may support access of a removable storage device such as a U disk, a removable hard disk and the like.

Figure 1:
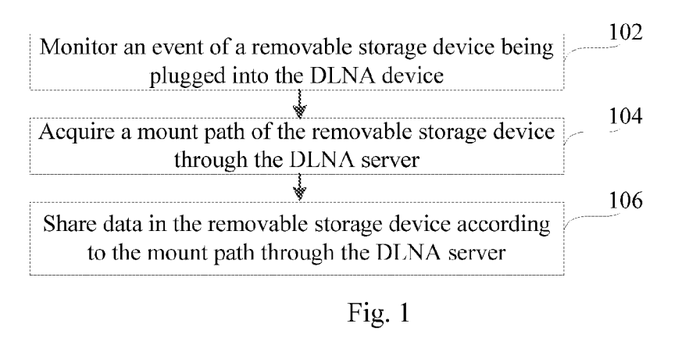
FIG. 1 is a flow chart illustrating a method for sharing data in a DLNA device according to an exemplary embodiment of the present disclosure.

FIG. 1 is a flow chart illustrating a method for sharing data in the DLNA device according to an exemplary embodiment. This embodiment will be illustrated by taking an example that the method for sharing data is applied to a DLNA device provided with a DLNA server. The method for sharing data may include the following steps.

In step 102, an event of a removable storage device being plugged into the DLNA device is monitored.

In step 104, a mount path of the removable storage device is acquired through the DLNA server when the event of the removable device being plugged into the DLNA device has occurred.

In step 106, data in the removable storage device are shared according to the mount path through the DLNA server.

Accordingly, in the method for sharing data provided by this embodiment, after the event of the removable storage device being plugged into the DLNA device is monitored by the DLNA device, the DLNA server acquires the mount path of the removable storage device when the event of the removable device being plugged into the DLNA device has occurred, and the DLNA server shares the data in the removable storage device according to the mount path. Thus, the problem in the related art that the DLNA server cannot share the media contents in the removable storage device is solved. Compared with the technical solution in the related art, in this embodiment, the DLNA server acquires the mount path of the removable storage device, then scans and acquires the data in the removable storage device according to the mount path, and then shares the data in the removable storage device with the DLNA client, so that the data in the removable storage device is shared in the DLNA system and the sharing capability of the DLNA system may be significantly improved.

Figure 2:
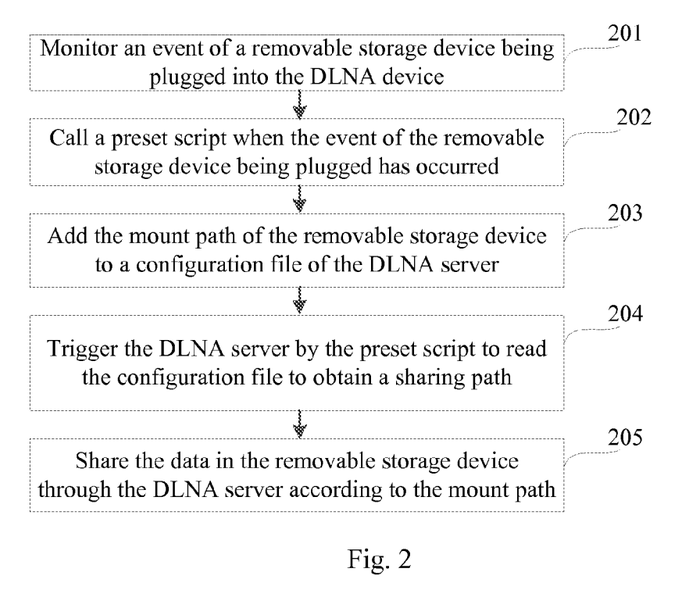
FIG. 2 is a flow chart illustrating a method for sharing data in a DLNA device according to another exemplary embodiment of the present disclosure.

FIG. 2 is a flow chart illustrating a method for sharing data in a DLNA device according to another exemplary embodiment. This embodiment will be illustrated by applying the method for sharing data to the DLNA device provided with a DLNA server. The method for sharing data may include the following steps.

In step 201, an event of a removable storage device being plugged into the DLNA device is monitored.

The DLNA device monitors the event of the removable storage device being plugged into the DLNA device. A hot swap event is generated when the removable storage device such as a U disk, a removable hard disk and the like is plugged in or unplugged from the DLNA device, and may be acquired by an operating system of the DLNA device.

In step 202, a preset script is called when the event of the removable storage device being plugged into the DLNA device has occurred.

When the hot swap event is detected by the operating system of the DLNA device, the preset script is called. The preset script is a script file implanted in the DLNA device in advance, which functions to cause the DLNA server to acquire a mount path of the removable storage device and further to scan and obtain data in the removable storage device according to the mount path.

In step 203, the mount path of the removable storage device is added to a configuration file of the DLNA server through the preset script.

The DLNA device adds the mount path of the removable storage device to the configuration file of the DLNA server through the preset script. The configuration file is configured to record a sharing path of data, which is sharable to the DLNA server. The sharing path refers to a storage path, in which the DLNA server sharable data is stored in a storage medium, such as media dir=/userdisk/data.

The DLNA server may only share with the DLNA client data which corresponds to the sharing path recorded in the configuration file. In other words, although data is stored in the storage medium of the DLNA device, however, the data cannot be shared by the DLNA sever, if the storage path of the data is not written in the configuration file. One or more sharing paths may be recorded in the configuration file.

In this embodiment, after the mount path of the removable storage device is added to the configuration file through the preset script, the mount path is transferred into the sharing path, so that the sharing of the data in the removable storage device may be performed by the DLNA server in the subsequent steps.

In step 204, the DLNA server is triggered by the preset script to read the configuration file to obtain a sharing path, which includes the mount path of the removable storage device.

The DLNA device triggers the DLNA server through the preset script to read the configuration file to obtain the sharing path. The sharing path includes the mount path of the removable storage device. This step may include the following sub steps.

Firstly, a preset signal is transmitted to the DLNA server through the preset script.

After the mount path of the removable storage device is added to the configuration file of the DLNA server through the preset script, the preset script transmits the preset signal to the DLNA server. The preset signal is a signal configured to trigger the DLNA server to reload the configuration file. For example, the preset script may call a preset function through an inter-process communication mechanism provided by the operating system, so as to transmit the preset signal to the DLNA server.

Secondly, the configuration file is reloaded through the DLNA server after the DLNA server receives the preset signal.

After the DLNA server receives the preset signal, the configuration file is reloaded, such that the mount path of the removable storage device added in the configuration file may be refreshed and acquired.

Thirdly, the sharing path is obtained by reading the configuration file through the DLNA server.

The DLNA server reads the configuration file to obtain the sharing path, after reloading the configuration file. The sharing path includes the mount path of the removable storage device added to the configuration file through the preset script.

In step 205, the data in the removable storage device is shared through the DLNA server according to the mount path.

The DLNA device shares the data in the removable storage device according to the mount path through the DLNA server. After obtaining the mount path added to the configuration file, the DLNA server scans and acquires files such as pictures, music and videos under a directory corresponding to the mount path according to the mount path, and shares the files with the DLNA client.

It should be noted that after receiving the preset signal transmitted by the preset script, the DLNA server may also perform a step of closing a file system monitoring mechanism for a predetermined period. The file system monitoring mechanism is configured to monitor files in the DLNA server which includes monitoring of accessing, reading, writing, modifying, deleting, creating or renaming, etc., and to provide feedback to the DLNA server. A start time of the predetermined period is an instant when the DLNA server receives the preset signal, and an end time of the predetermined period is an instant when the DLNA server reads the configuration file to obtain the sharing path. Through closing the file system monitoring mechanism for a while during the above mentioned predetermined period, a system overhead may be reduced, and feedback notification may be prevented from being repeatedly transmitted to the DLNA server by the internal core since the files are accessed, read and written and the like during a process that the DLNA server scans and acquires the files in the removable storage device.

It should be further noted that after the above step 205, the method may include the following steps.

Firstly, an event of the removable storage device being unplugged from the DLNA device is monitored.

The DLNA device monitors the event of the removable storage device being unplugged from the DLNA device. When the removable storage device is unplugged from the DLNA device, a hot swap event will be generated and thus may be acquired by the operating system.

Secondly, the preset script is called when the event of the removable storage device being unplugged from the DLNA device has occurred.

Similarly to the case when the event of the removable storage device being plugged into the DLNA device has occurred, when the event of the removable storage device being unplugged from the DLNA device is monitored and detected by the DLNA device, the preset script is called.

Thirdly, the mount path of the removable storage device is removed from the configuration file through the preset script.

The DLNA device removes the mount path of the removable storage device from the configuration file through the preset script. It is avoided that the DLNA server still tends to obtain a mount path by reading the configuration file and fails to scan and acquire the file corresponding to the mount path in a case that the removable storage device has been unplugged from the DLNA device.

Fourthly, the DLNA server is triggered through the preset script to read the configuration file to obtain the sharing path. In this case, the sharing path does not include the mount path of the removable storage device.

After the mount path of the removable storage device is removed from the configuration file through the preset script, the DLNA device still transmits a preset signal to the DLNA server through the preset script, such that the DLNA server reloads the configuration file after receiving the preset signal. Therefore, the refreshed configuration file will not record the mount path of the removable storage device. The DLNA server may obtain other sharing paths in the configuration file, and share files corresponding to the other sharing paths.

Accordingly, in the method for sharing data in the DLNA device provided by this embodiment, after the event of the removable storage device being plugged into the DLNA device is monitored by the DLNA device, the mount path of the removable storage device is acquired through the DLNA server and the data in the removable storage device is shared according to the mount path through the DLNA server. Thus, the problem in the related art that the DLNA server cannot share the media contents in the removable storage device is solved. Compared with the technical solution in the related art, in this embodiment, the DLNA server acquires the mount path of the removable storage device, then scans and acquires the data in the removable storage device according to the mount path, and then shares the data removable storage device, so that the data in the removable storage device is shared in the DLNA system and the sharing capability of the DLNA system may be significantly improved.

In addition, in this embodiment, the mount path of the removable storage device is written into the configuration file of the DLNA server through the preset script, so that the DLNA server may easily acquire the mount path in the configuration file, and thus the sharing of the data in the removable storage device may be realized, and the method is simple and easy to be implemented.

Hereinafter are embodiments regarding an apparatus according to the present disclosure, which may be configured to perform the embodiments of the method according to the present disclosure. Details that are not described in the embodiments of the apparatus according to the present disclosure may be referred to the embodiments of the method according to the present disclosure.

Figure 3:
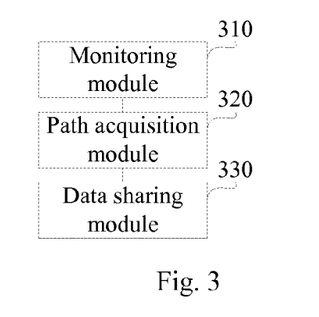
FIG. 3 is a block diagram illustrating an apparatus for sharing data in a DLNA device according to an exemplary embodiment of the present disclosure.

FIG. 3 is a block diagram illustrating an apparatus for sharing data in a DLNA device according to an exemplary embodiment. The apparatus for sharing data may be implemented by software as a part or the whole of a DLNA server in a DLNA device. The apparatus for sharing data may include a monitoring module 310, a path acquisition module 320 and a data sharing module 330.

The monitoring module 310 is configured to monitor an event of a removable storage device being plugged into the DLNA device.

The path acquisition module 320 is configured to acquire a mount path of the removable storage device through the DLNA server.

The data sharing module 330 is configured to share data in the removable storage device according to the mount path through the DLNA server.

Accordingly, in the apparatus for sharing data provided by this embodiment, after the event of the removable storage device being plugged into the DLNA device is monitored by the DLNA device, the mount path of the removable storage device is acquired through the DLNA server and the data in the removable storage device is shared according to the mount path through the DLNA server. Thus, the problem in the related art that the DLNA server cannot share the media contents in the removable storage device is solved. Compared with the technical solution in the related art, in this embodiment, the DLNA server acquires the mount path of the removable storage device, then scans and acquires the data in the removable storage device according to the mount path, and then shares the data in the removable storage device with the DLNA client, so that the data in the removable storage device is shared in the DLNA system and the sharing capability of the DLNA system may be significantly improved.

Figure 4:
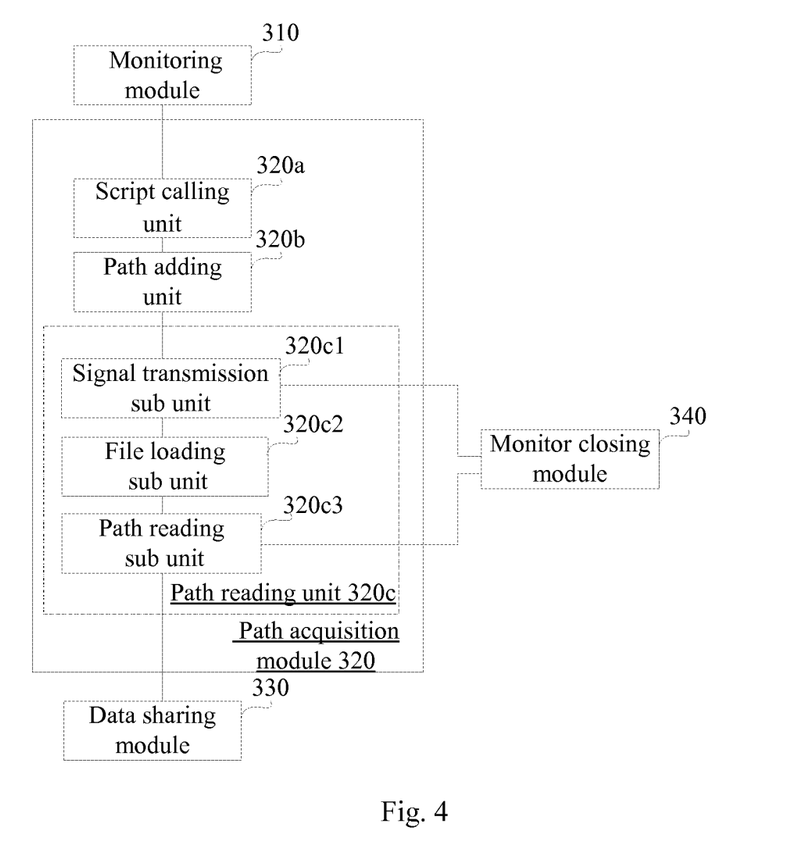
FIG. 4 is a block diagram illustrating an apparatus for sharing data in a DLNA device according to another exemplary embodiment of the present disclosure.

FIG. 4 is a block diagram illustrating an apparatus for sharing data in a DLNA device according to another exemplary embodiment. The apparatus for sharing data may be implemented by software as a part or the whole of a DLNA server in a DLNA device. The apparatus for sharing data may include the monitoring module 310, the path acquisition module 320 and the data sharing module 330.

The monitoring module 310 is configured to monitor an event of a removable storage device being plugged into the DLNA device.

The path acquisition module 320 is configured to acquire a mount path of the removable storage device through the DLNA server.

The path acquisition module 320 includes a script calling unit 320a, a path adding unit 320b and a path reading unit 320c.

The script calling unit 320a is configured to call a preset script when the event of the removable storage device being plugged into the DLNA device has occurred.

The path adding unit 320b is configured to add the mount path of the removable storage device to a configuration file of the DLNA server through the preset script. The configuration file is configured to record a sharing path of data, which is sharable to the DLNA server.

The path reading unit 320c is configured to trigger the DLNA server through the preset script so as to read the configuration file to obtain the sharing path, which includes the mount path of the removable storage device.

Alternatively, the path acquisition module 320 also includes a monitoring unit and a path removing unit (not shown).

The monitoring unit is configured to monitor an event of the removable storage device being unplugged from the DLNA device.

The script calling unit 320a is also configured to call the preset script when the event of the removable storage device being unplugged from the DLNA device has occurred.

The path removing unit is configured to remove the mount path of the removable storage device from the configuration file through the preset script.

The path reading unit 320c is also configured to trigger the DLNA server through the preset script so as to read the configuration file to obtain the sharing path, which does not include the mount path of the removable storage device.

The path reading unit 320c includes a signal transmission sub unit 320c1, a file loading sub unit 320c2 and a path reading sub unit 320c3.

The signal transmission sub unit 320c1 is configured to transmit a preset signal to the DLNA server through the preset script.

The file loading sub unit 320c2 is configured to reload the configuration file through the DLNA server after the DLNA server receives the preset signal.

The path reading sub unit 320c3 is configured to read the configuration file to obtain the sharing path through the DLNA server.

The data sharing module 330 is configured to share data in the removable storage device according to the mount path through the DLNA server.

Alternatively, the apparatus further includes a monitor closing module 340 configured to close a file system monitoring mechanism for a predetermined period through the DLNA server. The file system monitoring mechanism is configured to monitor files in the DLNA server and to provide feedback to the DLNA server;

A start time of the predetermined period is an instant when the DLNA server receives the preset signal, and an end time of the predetermined period is an instant when the DLNA server obtains the sharing path in the configuration file.

Accordingly, in the apparatus for sharing data provided by this embodiment, after the event of the removable storage device being plugged into the DLNA device is monitored by the DLNA device, the mount path of the removable storage device is acquired through the DLNA server and the data in the removable storage device is shared according to the mount path through the DLNA server. Thus, the problem in the related art that the DLNA server cannot share the media contents in the removable storage device is solved. Compared with the technical solution in the related art, in this embodiment, the DLNA server acquires the mount path of the removable storage device, then scans and acquires the data in the removable storage device according to the mount path, and then shares the data in the removable storage device with the DLNA client, so that the data in the removable storage device is shared in the DLNA system and the sharing capability of the DLNA system may be significantly improved.

In addition, in this embodiment, the mount path of the removable storage device is written into the configuration file of the DLNA server through the preset script, so that the DLNA server may easily acquire the mount path in the configuration file, and thus the sharing of the data in the removable storage device may be realized, and the method is simple and easy to be implemented.

It should be noted that, the process of sharing data performed by the apparatus for sharing data provided by the above-described embodiments, is only illustrated by example of functional modules as the above-mentioned. While in practice, the above functions may be performed by different modules as desired, that is, the internal structure of the apparatus may be divided into different functional modules, so as to achieve all or a part of the functions described above. In addition, the method and the device for sharing data provided by the above-described embodiments belong to the same conception, therefore, the detailed implementing process of the device may refer to the embodiments of the method, and the detailed description thereof are not repeated herein.

Figure 5:
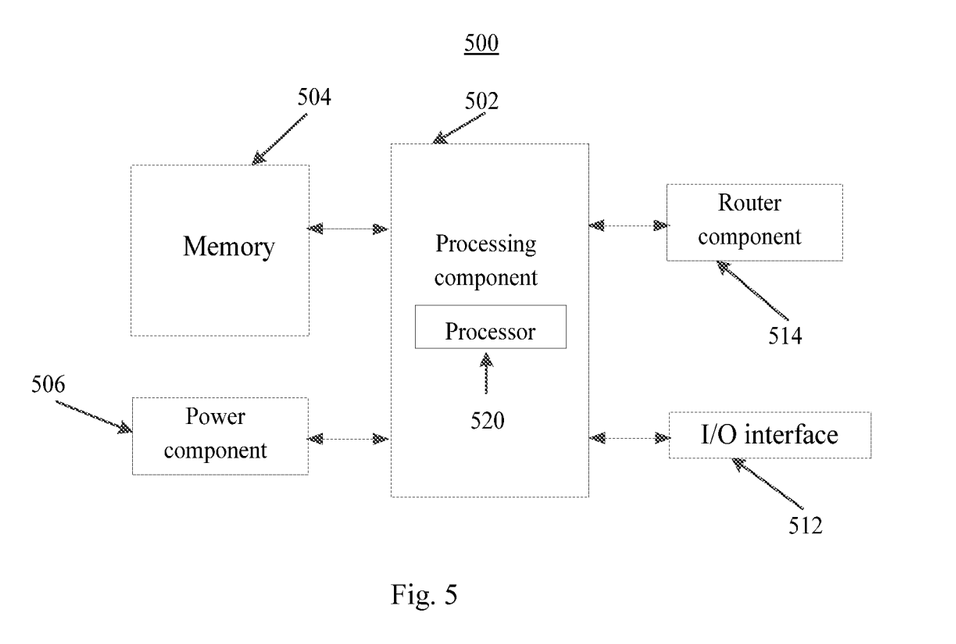
FIG. 5 is a block diagram illustrating a DLNA device for sharing data according to an exemplary embodiment of the present disclosure.

FIG. 5 is a block diagram illustrating a DLNA device for sharing data according to an exemplary embodiment. For example, the device 500 may be a smart router.

Referring to FIG. 5, the device 500 may include one or more of the following components: a processing component 502, a memory 504, a power component 506, an input/output (I/O) interface 512 and a router component 514.

The processing component 502 typically controls overall operations of the device 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 500. Examples of such data include instructions for any applications or methods operated on the device 500, contact data, phonebook data, messages, pictures, videos, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 may include a power management system, one or more power sources, and any other components associated with the generation, management, and distribution of power in the device 500.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The router component 514 is a component configured to connect various LANs and WANs over the Internet. The router component 514 may be a component configured to automatically select and set a route according to the conditions of channels, and transmit signals by an optimal path according to the sequence.

In addition, the device 500 may further include a USB interface (not shown), configured to support connection of a removable storage device such as a U disk, a removable hard disk and the like.

Also, a DLAN server runs in the device 500. The DLNA server is an application with a server type, configured to implement the sharing of media contents such as pictures, music, videos and the like.

In exemplary embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 504, executable by the processor 520 in the device 500, for performing the above-described methods. For example, the non-transitory computer-readable storage medium may be a ROM, a RAM, a CD-ROM, a magnetic tape, a floppy disc, an optical data storage device, and the like.

A nonvolatile computer readable storage medium, instructions in the storage medium are executed by the processor of the removable device, so that the removable device performs a method for sharing data, which includes: monitoring an event of a removable storage device being plugged into a DLNA device; acquiring a mount path of the removable storage device through a DLNA server configured in the DLNA device, when an event of the removable storage device being plugged into a DLNA device has occurred; and sharing data in the removable storage device according to the mount path through the DLNA server.

Alternatively, acquiring the mount path of the removable storage device through the DLNA server includes: calling a preset script when the event of the removable storage device being plugged into the DLNA device has occurred; adding the mount path of the removable storage device to a configuration file, which is configured to record a sharing path of data that is sharable to the DLNA server, through the preset script; and triggering the DLNA server to read the configuration file to obtain the sharing path, which includes the mount path of the removable storage device, through the preset script.

Alternatively, the method also includes: monitoring an event of the removable storage device being unplugged from the DLNA device; calling the preset script when the event of the removable storage device being unplugged from the DLNA device has occurred; removing the mount path of the removable storage device from the configuration file through the preset script; and triggering the DLNA server to read the configuration file to obtain the sharing path, which does not include the mount path of the removable storage device, through the preset script.

Alternatively, triggering the DLNA server to read the configuration file to obtain the sharing path includes: transmitting a preset signal to the DLNA server through the preset script; reloading the configuration file through the DLNA server after DLNA server receives the preset signal; and reading the configuration file to obtain the sharing path through the DLNA server.

Alternatively, the method also includes: closing a file system monitoring mechanism, which is being configured to monitor files in the DLNA server and to provide feedback to the DLNA server, for a predetermined period through the DLNA server.

In this case, a start time of the predetermined period is an instant when the DLNA server receives the preset signal, and an end time of the predetermined period is an instant when the DLNA server obtains the sharing path in the configuration.

In addition, the method according to the present disclosure may also be implemented as a computer program, which may be stored in a computer readable storage medium, executed by a CPU. When being executed by the CPU, the computer program performs the above functions defined in the method according to the present disclosure.

In addition, the above steps of the method and the units of the system may also by implemented with a controller and a computer-readable storage device which stores computer programs that cause the controller to realize the above steps and functions of the units.

In addition, it should be appreciated that the above mentioned computer-readable storage device (for example, a memory) may be a volatile memory or a nonvolatile memory, or may include the both. For example, but without limitation, the nonvolatile memory may include a read only memory (ROM), a programmable ROM (PROM), an electrically programmable ROM (EPROM), an electrically erasable programmable ROM (EEPROM) or a flash memory. The volatile memory may include a random access memory (RAM) which may serve as an external cache RAM memory. As an example, but without limitation, the RAM may be of various forms, such as a synchronous RAM (DRAM), a dynamic RAM (DRAM), a synchronous DRAM (SDRAM), a double data rate SDRAM (DDR SDRAM), an enhanced SDRAM (ESDRAM), a synchronous link DRAM (SLDRAM) and a direct Rambus RAM (DRRAM). The storage device according to the disclosed aspects is intended to include but is not limited to these and other suitable types of memories.

It should be appreciated by those skilled in the art that, various exemplary logical blocks, modules, circuits and algorithm steps described in conjunction with the present disclosure may be implemented as electronic hardware, computer software or combination of both. In order to clearly illustrate the interchangeability between the hardware and the software, a general description has been given to various illustrative components, blocks, modules, circuits and functions of steps. It depends on particular applications and the restrictions applied to the design of the whole system that such functions will be implemented as software or hardware. Those functions may be realized in various means with respect to each of the particular applications by those skilled in the art without departing the scope of the present disclosure.

Various illustrative logical blocks, modules and circuits described in conjunction with the present disclosure may be implemented or performed by the following components that are designed to perform the above functions: a general purpose processor, a digital signal processor (DSP), a dedicated integrated circuit (ASIC), a field programmable gate array (FPGA) or other programmable logic device, discrete gates or transistor logics, discrete hardware components or any combination of these components. The general purpose processor may be a microprocessor. Alternatively, the processor may be any one of a conventional processor, a controller, a microcontroller or a state machine. The processor may be implemented as combination of computing devices, such as combination of a DSP and a microprocessor, a plurality of microprocessors, one or more microprocessors in conjunction with a DSP core, or any other such configuration.

The method and steps of the algorithm described in conjunction with the present disclosure may be directly contained in hardware, in a software module executed by a processor or in combination of the both. The software may reside in a RAM memory, a flash memory, a ROM memory, an EPROM memory, an EEPROM memory, a registers, a hard disk, a removable disk, a CD-ROM, or any other storage medium known in the art. An exemplary storage medium is coupled to the processor such the processor can read information from the storage medium or write information thereto. In an alternative embodiment, the storage medium maybe integrated with the processor. The processor and the storage medium may reside in an ASIC which may reside in a user terminal. In an alternative embodiment, the processor and the storage medium may reside in a user terminal as discrete components.

In one or more exemplary designs, the above functions may be implemented in hardware, software, firmware or any combination thereof. If implemented in software, the above functions may be stored in a computer readable medium as one or more instructions or codes, or transmitted through the computer readable medium. The computer readable medium includes computer storage medium and communication medium. The communication medium includes any medium that may be used to transmit computer programs from one location to another location. The storage medium may be any available medium that is accessible by a general or special computer. For example, but without limitation, the computer readable medium may include a RAM, a ROM, an EEPROM, a CD-ROM or other CD storage devices, disk storage device or other magnetic storage devices, or any other medium that may be used to carry or store the required program codes in a form of instructions or data structure and may be accessible by a general or special computer or a general or special processor. In addition, any connection may be appropriately called as a computer-readable medium. For example, if a coaxial cable, a fiber optic cable, a twisted pair, a digital subscriber line (DSL) or wireless technologies such as infrared rays, radio and microwave are used to transmit software from a website, a server or other remote source, the above coaxial cable, the fiber optic cable, the twisted pair, the DSL or wireless technologies such as infrared rays, radio and microwave are all within the definition of the medium. As used herein, the disk and the optical disk includes a compression disk (CD), a laser disc, an optical disk, a digital versatile disc (DVD), a floppy disks and a blue-ray disk, wherein the magnetic disk normally represents data magnetically, and the optical disk represents data optically by utilizing a laser. The combination of the above should also be included in the scope of the computer readable medium.

Although the above embodiments of the present disclosure are disclosed exemplary embodiments, it should be noticed that, various alteration and modification may be made without departing the scope of the present disclosure, which is defined by the claims. The functions, steps and/or operations of the method claims according to the described embodiments of the present disclosure, may not necessarily be performed in a particular order. In addition, although the element of the present disclosure is described or prescribed in a single form, it may be multiple-form, unless it is explicitly prescribed as a single form.

The sequence numbers of the above embodiments of the present disclosure are only for description purpose, and do not represent any preference of those embodiments.

It should be understood by those skilled in the art that, all or a part of the steps of the above embodiments may be implemented through hardware, or through a program that instructs a related hardware. The program may be stored on a computer-readable storage medium which may be read-only memory, magnetic or optical disks.

The foregoing are only preferred embodiments of the disclosure, and do not intend to limit the disclosure. Any variation, equivalent substitution and modification that fall within the concept and principle of the disclosure should be embraced by the protective scope of the disclosure.

What is claimed is:

1. A method for sharing data in a Digital Living Network Alliance (DLNA) device, comprising:
    monitoring an event of a removable storage device being plugged into the DLNA device;
    acquiring a mount path of the removable storage device through a DLNA server configured in the DLNA device, when the event of the removable storage device being plugged into the DLNA device has occurred, wherein acquiring the mount path of the removable storage device through the DLNA server comprises:
    calling a preset script when the event of the removable storage device being plugged into the DLNA device has occurred;
    adding the mount path of the removable storage device to a configuration file, which is configured to record a sharing path of data that is sharable to the DLNA server, through the preset script; and
    triggering the DLNA server to read the configuration file to obtain the sharing path, which comprises the mount path of the removable storage device, through the preset script, wherein triggering the DLNA server to read the configuration file to obtain the sharing path comprises:
        transmitting a preset signal to the DLNA server through the preset script;
        reloading the configuration file through the DLNA server after the DLNA server receives the preset signal;
        reading the configuration file to obtain the sharing path through the DLNA server: and
        closing a file system monitoring mechanism, which is being configured to monitor files in the DLNA server and to provide feedback to the DNLA server, for a predetermined period through the DLNA server, wherein a start time of the predetermined period is an instant when the DLNA server receives the preset signal, and an end time of the predetermined period is an instant when the DLNA server obtains the sharing path in the configuration file; and
    sharing data in the removable storage device according to the mount path through the DLNA server.

2. The method according to claim 1, further comprising:
    monitoring an event of the removable storage device being unplugged from the DLNA device;
    calling the preset script when the event of the removable storage device being unplugged from the DLNA device has occurred;
    removing the mount path of the removable storage device from the configuration file through the preset script; and
    triggering the DLNA server to read the configuration file to obtain the sharing path, which does not comprise the mount path of the removable storage device, through the preset script.

3. A Digital Living Network Alliance (DLNA) device, comprises:
    a processor; and
    a memory for storing instructions executable by the processor,
    wherein the processor is configured to perform:
    monitoring an event of a removable storage device being plugged into the DLNA device;
    acquiring a mount path of the removable storage device through a DLNA server configured in the DLNA device, when the event of the removable storage device being plugged into the DLNA device has occurred, wherein acquiring the mount path of the removable storage device through the DLNA server comprises:
        calling a preset script when the event of the removable storage device being plugged into the DLNA device has occurred;
        adding the mount path of the removable storage device to a configuration file, which is configured to record a sharing path of data that is sharable to the DLNA server, through the preset script; and
        triggering the DLNA server to read the configuration file to obtain the sharing path, which comprises the mount path of the removable storage device, through the preset script, wherein triggering the DLNA server to read the configuration file to obtain the sharing path comprises:
            transmitting a preset signal to the DLNA server through the preset script;
            reloading the configuration file through the DLNA server after the DLNA server receives the preset signal;
            reading the configuration file to obtain the sharing path through the DLNA server; and
            closing a file system monitoring mechanism, which is being configured to monitor files in the DLNA server and to provide feedback to the DNLA server, for a predetermined period through the DLNA server, wherein a start time of the predetermined period is an instant when the DLNA server receives the preset signal, and an end time of the predetermined period is an instant when the DLNA server obtains the sharing path in the configuration file; and
    sharing data in the removable storage device according to the mount path through the DLNA server.

4. The device according to claim 3, further comprising:
    monitoring an event of the removable storage device being unplugged from the DLNA device;
    calling the preset script when the event of the removable storage device being unplugged from the DLNA device has occurred;
    removing the mount path of the removable storage device from the configuration file through the preset script; and
    triggering the DLNA server to read the configuration file to obtain the sharing path, which does not comprise the mount path of the removable storage device, through the preset script.

5. A non-transitory computer-readable storage medium having stored therein instructions that, when executed by a processor of a Digital Living Network Alliance (DLNA)

device, causes the DLNA device to perform a method for sharing data, wherein the method comprises:
  monitoring an event of a removable storage device being plugged into the DLNA device;
  acquiring a mount path of the removable storage device through a DLNA server configured in the DLNA device, when the event of the removable storage device being plugged into the DLNA device has occurred, wherein acquiring the mount path of the removable storage device through the DLNA server comprises:
  calling a preset script when the event of the removable storage device being plugged into the DLNA device has occurred;
  adding the mount path of the removable storage device to a configuration file, which is configured to record a sharing path of data that is sharable to the DLNA server, through the preset script; and
  triggering the DLNA server to read the configuration file to obtain the sharing path, which comprises the mount path of the removable storage device, through the preset script,
  wherein triggering the DLNA server to read the configuration file to obtain the sharing path comprises:
    transmitting a preset signal to the DLNA server through the preset script;
    reloading the configuration file through the DLNA server after the DLNA server receives the preset signal;
    reading the configuration file to obtain the sharing path through the DLNA server; and
    closing a file system monitoring mechanism, which is being configured to monitor files in the DLNA server and to provide feedback to the DNLA server, for a predetermined period through the DLNA server, wherein a start time of the predetermined period is an instant when the DLNA server receives the preset signal, and an end time of the predetermined period is an instant when the DLNA server obtains the sharing path in the configuration file; and
  sharing data in the removable storage device according to the mount path through the DLNA server.

* * * * *